Nov. 25, 1930. J. T. RYAN 1,782,584
TIRE VALVE DUST CAP AND LOCKING MECHANISM THEREFOR
Filed Dec. 27, 1926
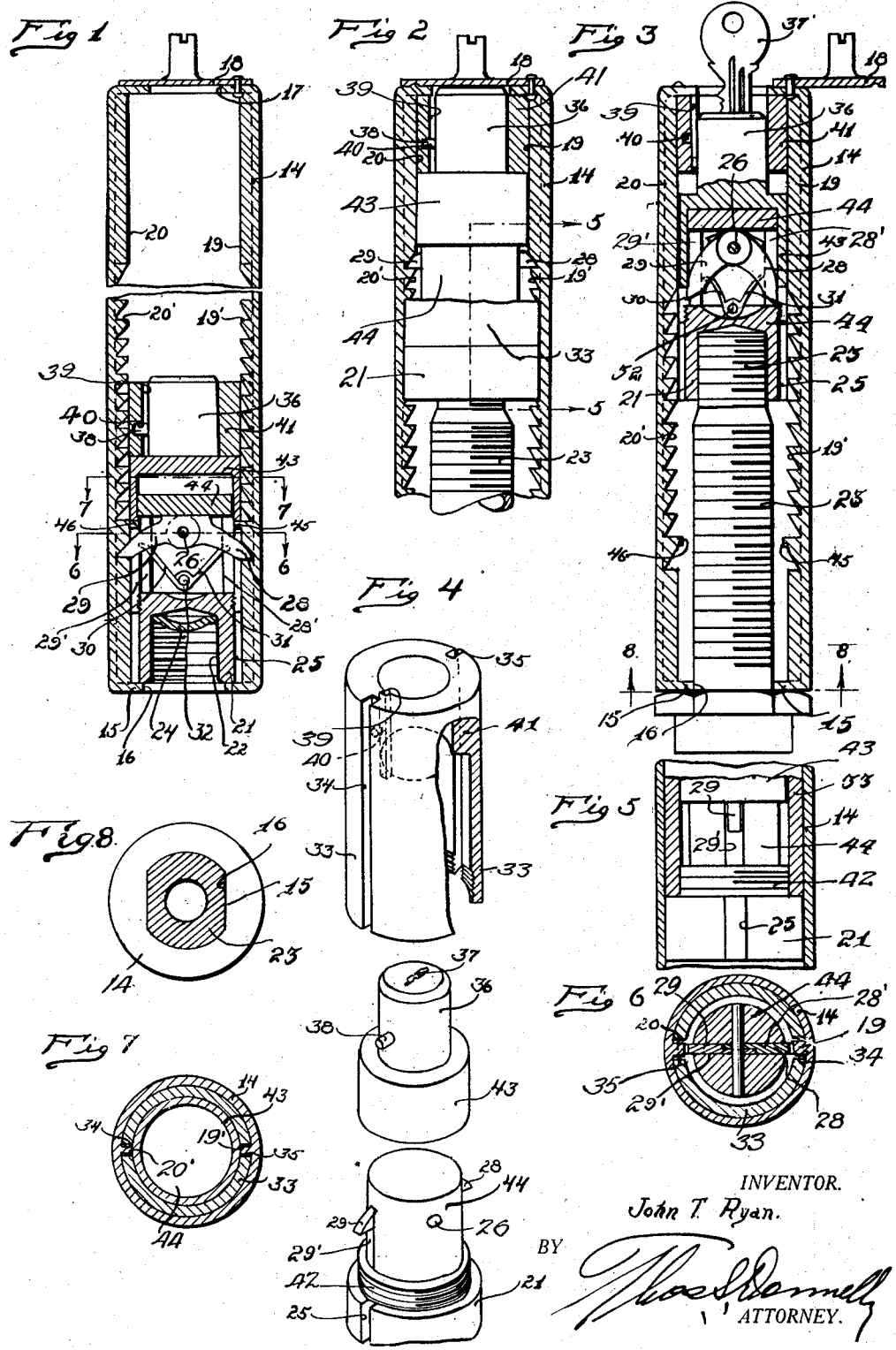
INVENTOR.
John T. Ryan.
BY
ATTORNEY.

Patented Nov. 25, 1930

1,782,584

UNITED STATES PATENT OFFICE

JOHN T. RYAN, OF DETROIT, MICHIGAN

TIRE-VALVE DUST CAP AND LOCKING MECHANISM THEREFOR

Application filed December 27, 1926. Serial No. 157,116.

My invention relates to a new and useful improvement in a tire valve dust cap and locking mechanism therefor, and has for its object the provision of a device which may be mounted on a tire valve stem and locked in position so as to prevent the removal of the tire from the vehicle wheel, while the device is mounted on the tire valve stem.

Another object of the invention is the provision of a dust cap for a tire valve stem so arranged and constructed that is may be automatically locked in position on the tire valve stem.

Another object of the invention is the provision of a key operated means for releasing a locking mechanism for permitting the removal of a dust cap from a tire valve stem.

Other objects will appear hereinafter.

The invention consists in the combination and arrangement of parts hereinafter described and claimed.

The invention may be best understood by a reference to the accompanying drawings which form a part of this specification and in which, Fig. 1. is a central vertical sectional view of the invention showing the tire valve stem in fragment and displaced slightly therefrom.

Fig. 2 is a fragmentary central sectional view of the invention with a part broken away.

Fig. 3 is a view similar to Fig. 1 but showing the releasing mechanism operative.

Fig. 4 is a perspective view in disassembled position, of mechanism mounted within the dust cap proper.

Fig. 5 is a fragmentary sectional view taken on substantially line 5—5 of Fig. 2.

Fig. 6 is a sectional view taken substantially on line 6—6 of Fig. 1.

Fig. 7 is a sectional view taken on line 7—7 of Fig. 1.

Fig. 8 is a view taken on line 8—8 of Fig. 3.

The invention comprises a casing, or dust cap proper, 14 having its lower end bent inwardly to provide inwardly projecting flanges 15, these inwardly projecting flanges providing an opening 16 which is adapted to pass over the flattened sides of the tire valve stem having a reduced portion 23. An opening 17 is formed in the top of the cap 14 and the cap is provided with a swingably mounted closure 18 for closing the opening 17. At diametrically opposite sides of the inner surface of the casing 14, extending axially thereof, are ribs 19 and 20, having teeth 19' and 20' respectively formed thereon throughout a portion of their length. Positioned slidably in the casing 14 is a head 21 having a threaded socket 22 formed therein for the reception of the reduced portion 23 of the tire valve stem. Positioned in the socket 22 at its base is a suitable gasket 24 for engaging the open end of the tire valve stem when the head is threaded thereon. Axially extending grooves 25 are formed in the head 21 for the reception of the ribs 19 and 20 so that these ribs will prevent a rotation of the head 21 in the casing 14. Projecting upwardly from the head 21 is a cylindrical portion, 44, in which is pivotally mounted on a pin 26 a pair of dogs 28 and 29. Engaging the dog 28 is one end 31 of a wire spring, the other end 30 engaging the dog 29, this spring being doubled over upon itself and coiled on the pin 32 which is projected through the barrel 44. The spring normally tends to separate the dogs 28 and 29 so as to project them through the slots 28' and 29' respectively formed in the barrel 44 so that as the head 21 is moved axially in the casing 14, these dogs will engage the teeth 19' and 20' to prevent movement of the head 21 in one direction in the casing 14. A sleeve 33 is also slidably mounted in the casing 14, this sleeve being provided with axially extending diametrically opposite peripheral slots 34 and 35, these slots extending through the sleeve 33 except at the thickened portion 41, the slots 34 and 35 forming grooves in this thickened portion 41. Formed on the inner surface of the sleeve 33 at the thickened portion 41 is an axially extending slot 39 in which may engage the plunger 38 which projects outwardly from the lock barrel 36 carried by the cup shaped releasing member 43. A suitable opening 37 is provided in the barrel 36 for the entry of a key 37' therein to withdraw the plunger 38 at will. The specific structure of the lock mechanism in the barrel 36 is not given, as it of itself forms no specific part of this invention, and may be of a type well known.

Formed in the thickened portion 41 is a radially extending pocket or opening 40 in which the plunger 38 may engage so as to lock the barrel 36 in fixed relation relatively to the sleeve 33. This sleeve 33 is adapted for threading upon the reduced portion 42 of the head 21. In operation, after the sleeve 33 is threaded on the reduced portion 42 of the head 21 and the barrel 36 is projected beyond the upper end of the sleeve 33, as shown in Fig. 1 and Fig. 2, the sleeve and the parts attached thereto are inserted into the casing 14, the ribs 19 and 20 engaging in the slots 34 and 35, as well as the grooves 25, the plunger 38 engaging in the radially extending opening 40. The flanges 15 may then be formed so as to secure these parts within the casing 14. The various parts will then be in the position shown in Fig. 1 and the head 21 may be threaded on the reduced portion 23 of the valve stem. When this is done, the casing 14 may then be moved axially downwardly so as to cover the valve stem and seal the same from dust.

As this casing 14 is moved axially downwardly, the sleeve 33 and the parts attached thereto will be supported by the valve stem, so that the dogs 28 and 29 engaging the teeth 19′ and 20′ will ride over these teeth and prevent the reverse movement of the casing relatively to the valve stem. As the valve stem enters the opening 16, a rotation of the mechanism on the valve stem is prevented, so that a removal of the dust cap and the head 21 which forms a cap for the valve stem, is prevented until the dogs 28 and 29 are released from engagement with the teeth 19′ and 20′. When the casing 14 is thrust downwardly the parts will have moved to the position shown in Fig. 2, the plunger 38 engaging in the opening 40, as shown. To release the mechanism to permit its removal from the valve stem, the key 37′ may be inserted into the lock barrel 36 and the plunger 38 withdrawn from the opening 40, upon which the lock barrel 36, together with its cup shaped releasing member 43, may be thrust downwardly into position shown in Fig. 3, so as to press inwardly the dogs 28 and 29 and release the same from engagement with the teeth 19′ and 20′. The key 37′ may then be removed and the casing 14 moved axially into the position shown in Fig. 1 so that the flattened portion of the valve stem no longer engages in the opening 16. The device may then be unthreaded from the tire valve stem. When the casing is moved axially, after the various parts have been moved to the position shown in Fig. 3, the inwardly projecting bosses 45 and 46 carried on the inner surface of the casing 14 will engage the lower edges of the cup shaped releasing member 43 and move it upwardly into the position relatively to the sleeve 41, shown in Fig. 2, so that when the casing 14 is moved axially downwardly again, the device will have been released for automatically latching the casing against axial movement in one direction relatively to the sleeve 33.

The tire valve stem, which I have shown, the device attached thereto, is of that type which is generally used on vehicle wheels having pneumatic tires in which the valve stem is projected through an opening formed in the felly or rim of the vehicle wheel. This opening is generally of such a size that the tire valve stem fits snugly therein, so that when the dust cap is mounted on the valve stem, a withdrawal of the valve stem from its projected position, is prevented. Consequently, with the mechanism shown, by locking the dust cap on the tire valve stem, I have produced a means whereby an undue removal of the tire from the vehicle wheel may be prevented without a mutilation of the tire itself, thus guarding against the theft of the tires from the vehicle wheels.

While I have illustrated and described the preferred form of construction, I do not wish to limit myself to the precise form of structure shown, but desire to avail myself of such variations and modifications as may come within the scope of the appended claims.

Having thus described my invention what I claim as new and desire to secure by Letters Patent is:

1. A device of the class described adapted for mounting on a tire valve stem, comprising: a head for threading on said stem; a casing movable axially of said head for covering said stem after the threading of said head thereon; locking means for preventing the movement of said casing in the opposite direction; and means for releasing said locking means.

2. A device of the class described comprising: a casing; a socket bearing head slidably mounted in said casing and adapted for threading on a tire valve stem; a latch mechanism carried by said head; teeth on said casing for engaging said latch mechanism, the engagement of said teeth with said latch mechanism preventing axial movement of said casing relatively to said latch mechanism in one direction; and movable means for rendering inoperative said latch mechanism.

3. A device of the class described comprising: a casing; a socket bearing head slidably mounted in said casing and adapted for threading on a tire valve stem; a latch mechanism carried by said head; teeth on said casing for engaging said latch mechanism, the engagement of said teeth with said latch mechanism preventing axial movement of said casing relatively to said latch mechanism in one direction; and movable means for rendering inoperative said latch mechanism; and key operated means for controlling the movement of said movable means.

4. A device of the classe described comprising: a casing; a head slidably mounted in said casing and adapted for threading on a tire valve stem; axially extending spaced teeth formed on the inner surface of said casing; a latch mechanism carried by said head for engaging said teeth and preventing axial movement of said casing relatively to said head in one direction; a sleeve carried by said head and slidable therewith in said casing; a releasing member slidably mounted in said sleeve and adapted upon movement in one direction for rendering said latch mechanism inoperative.

5. A device of the class described comprising: a casing; a head slidably mounted in said casing and adapted for threading on a tire valve stem; axially extending spaced teeth formed on the inner surface of said casing; a latch mechanism carried by said head for engaging said teeth and preventing axial movement of said casing relatively to said head in one direction; a sleeve carried by said head and slidable therewith in said casing; a releasing member slidably mounted in said sleeve and adapted upon movement in one direction for rendering said latch mechanism inoperative; and key operated means for controlling the movement of said releasing member.

6. A device of the class described comprising: a casing; a head slidably mounted in said casing and adapted for threading on a tire valve stem; axially extending spaced teeth formed on the inner surface of said casing; a latch mechanism carried by said head for engaging said teeth and preventing axial movement of said casing relatively to said head in one direction; a sleeve carried by said head and slidable therewith in said casing; a releasing member slidably mounted in said sleeve and adapted upon movement in one direction for rendering said latch mechanism inoperative; key operated means for controlling the movement of said releasing member; and means on said casing for moving, upon movement of said casing relatively to said head in one direction a predetermined distance, said releasing member to inoperative position.

In testimony whereof I have signed the foregoing specification.

JOHN T. RYAN.